United States Patent [19]
Kanno et al.

[11] Patent Number: 5,229,800
[45] Date of Patent: Jul. 20, 1993

[54] LENS BARREL WITH SELECTABLE MANUAL AND AUTO FOCUS

[75] Inventors: Hideo Kanno, Chiba; Hideshi Naito, Tokyo; Kunihiro Fukino, Fujisawa, all of Japan

[73] Assignee: Nikon Corporation, Tokyo, Japan

[21] Appl. No.: 718,997

[22] Filed: Jun. 21, 1991

[30] Foreign Application Priority Data

Jun. 27, 1990 [JP] Japan .................. 2-67294[U]

[51] Int. Cl.$^5$ .................................................. G03B 1/18
[52] U.S. Cl. ................................................ 354/195.12
[58] Field of Search ............... 354/195.1, 195.12, 400; 359/696, 697, 698

[56] References Cited

U.S. PATENT DOCUMENTS

| | | | |
|---|---|---|---|
| 4,272,174 | 6/1981 | Terramoto et al. | 354/195.1 |
| 4,413,894 | 11/1983 | Miki et al. | 354/195.12 |
| 4,553,817 | 11/1985 | Ando et al. | 354/400 X |
| 4,893,145 | 1/1990 | Matsuda | 354/400 |
| 5,041,885 | 8/1991 | Takezawa et al. | 354/195.1 |

Primary Examiner—Michael L. Gellner
Assistant Examiner—J. K. Han
Attorney, Agent, or Firm—Shapiro and Shapiro

[57] ABSTRACT

A lens barrel is provided with a detecting device for detecting whether a clutch device for effecting the AF mode/MF mode changeover of a focus adjusting mechanism is changed over completely to either mode. When the detecting device detects that the changeover is not complete, as due to the supply of electric power from the camera body being cut off, the clutch device is automatically brought to the change-over position of a selected mode in response to the next supply of electric power.

2 Claims, 3 Drawing Sheets

LENS BARREL WITH SELECTABLE MANUAL AND AUTO FOCUS

BACKGROUND OF THE INVENTION

1. Field of the Invention

This invention relates to a lens barrel in which an auto focus (hereinafter referred to as AF) mode and a manual focus (hereinafter referred to as MF) mode can be selectively changed over to thereby accomplish the focusing of a photo-taking lens system (a focusing optical system).

2. Related Background Art

A camera provided with a focus adjusting mechanism by AF (auto focus) can accomplish photographing appropriately and reliably by simply being turned to an object. Such a camera does not require cumbersome focusing and therefore is excellent in snapshot capability operability, etc. However, it is sometimes the case even with such an AF type camera that a distance sensor does not work, depending on object conditions and the object distance cannot be measured. In such cases, it is regarded as necessary to design the camera such that the focus adjusting mechanism is operated by a manual operation and focusing by so-called MF (manual focus) can be accomplished. It has heretofore been conceived to use, for example, an electromagnetic clutch or the like as a changeover device for selectively changing over the focus adjusting mechanism of this kind to the AF mode or the MF mode in response to a mode changeover operating device.

When in the focus adjusting mechanism of the AF mode/MF mode changeover type as described above, changeover operation is to be performed from the MF mode to the AF mode or from the AF mode to the MF mode, if the electromagnetic clutch as described above is used as the changeover device, a practical problem as will hereinafter be described has arisen. When the power source voltage of the camera drops to bring about the so-called 0sec hold state in which a half-depression timer by the half-depression of a release button does not work, the half-depression switch changes over from its ON state to its OFF state, whereby the supply of electric power to the various portions of the camera is cut off. As a result the restoration to the AF mode or to the MF mode by the above-described electromagnetic clutch cannot be completed, and this has given rise to the problem that a reliable mode changeover operation cannot be accomplished.

When the electromagnetic clutch is thus stopped in the course of the changeover operation and the mode changeover is incomplete, there arises the problem that the focus adjusting mechanism does not work and focusing cannot be accomplished. Particularly, when effecting photographing with the mode changeover effected from the MF mode and focusing effected automatically in the AF mode, there arises the problem that the reliability of focusing is inadequate.

SUMMARY OF THE INVENTION

In order to avoid the above-described problems a lens barrel according to the present invention is provided with a detecting device for detecting whether a clutch device for effecting the AF mode/MF mode changeover of a focus adjusting mechanism is changed over completely to either mode.

When the detecting device detects that the changeover is not complete, as due to the supply of electric power from the camera body being cut off, the clutch device is automatically brought to the change-over position of a selected mode in response to the next supply of electric power.

According to the present invention, it is possible to ensure that a changeover position will always be secured, whereby appropriate and reliable focusing of the camera can be accomplished.

DESCRIPTION OF THE PREFERRED EMBODIMENT

Figure 1:
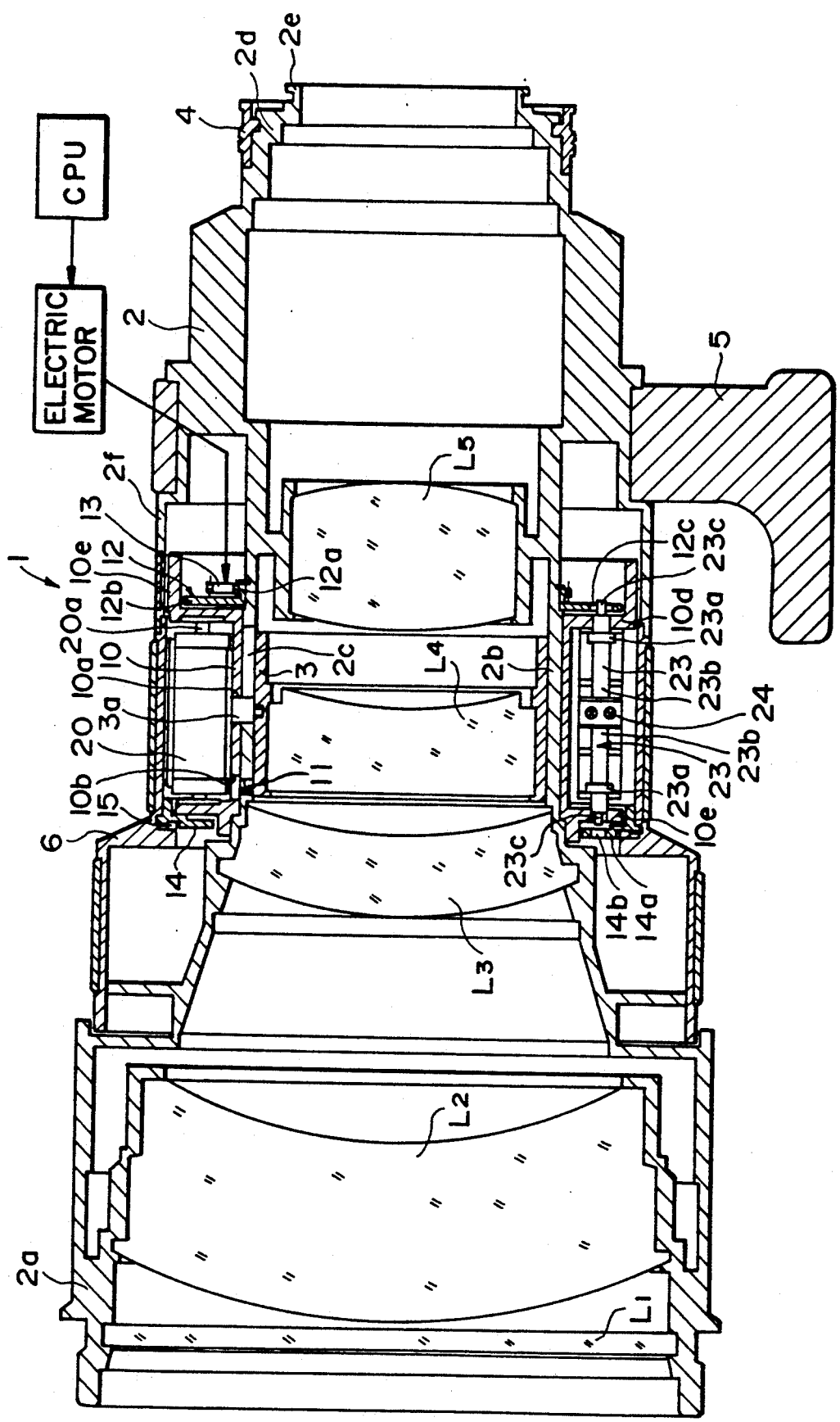
FIG. 1 is a longitudinal cross-sectional side view generally showing an embodiment of a lens barrel according to the present invention.

The present invention will hereinafter be described with respect to an embodiment thereof shown in the drawings.

Referring to FIGS. 1 to 4 which show an embodiment of a lens barrel according to the present invention, the lens barrel generally designated by 1 is provided with a lens holding fixed cylinder 2. A protective lens L1 and a first group of fixed lenses L2 are arranged side by side in the direction of the optical axis and incorporated and fixed in the forward large-diametered portion 2a of the fixed cylinder 2, and a second group of fixed lenses L3 and a fourth group of fixed lenses L5 are incorporated and fixed in the central portion of the fixed cylinder 2 with respect to the direction of the optical axis. Between the second group of fixed lenses L3 and the fourth group of fixed lenses L5 in the fixed cylinder 2, a focus cylinder 3 for holding a focus lens L4 as a third group of lenses on the optical axis is disposed for movement only along the direction of the optical axis with the aid of a guide slot 2c formed in the central small-diametered cylinder portion 2b of the fixed cylinder 2. A mount portion 2e for engaging a camera body, not shown, is provided on the rearward small-diametered portion 2d of the fixed cylinder 2, and an aperture ring 4 is fitted to the outer peripheral portion of the small-diametered portion 2d. Further, a tripod seat 5 is rotatably assembled to and held on the outer peripheral portion of the central large-diametered cylinder portion 2f of the fixed cylinder 2. Between the central large-diametered cylinder portion 2f and the forward large-diametered portion 2a of the fixed cylinder 2, a manual focus ring (hereinafter referred to as the MF ring) 6 is fitted and held for rotation about the optical axis.

Further, in an annular space formed in the central portion of the fixed cylinder 2 and outside the small-diametered cylinder portion 2b, a cam ring 10 is fitted and rotatably held on the outer peripheral portion of the small-diametered cylinder portion 2b and is rotatable only by a predetermined angle about the optical axis by an engagement pin 11 studded on the fixed cylinder 2 side and a circumferential groove 10b formed in the cam ring 10. Distance divisions are formed in the outer peripheral surface of the rearward large-diametered portion 10e of the cam ring 10 so that the distance divisions can be observed through a transparent window provided in the central large-diametered portion 2f of the fixed cylinder 2.

The cam ring 10 cooperates with the focusing ring 3 to provide means for moving the focusing optical system L4 along the optical axis. More particularly, a focus pin 3a studded in the outer peripheral portion of the focus cylinder 3 and engaged with the guide slot 2c in the fixed cylinder 2 has its tip end portion engaged in a cam slot 10a formed in the cam ring 10, and by this cam slot 10a being displaced with the rotational displacement of the cam ring 10, the focus cylinder 3 is moved back and forth in the direction of the optical axis through the intermediary of the focus pin 3a so as to drive the focusing optical system L4 for focusing.

Figure 4:
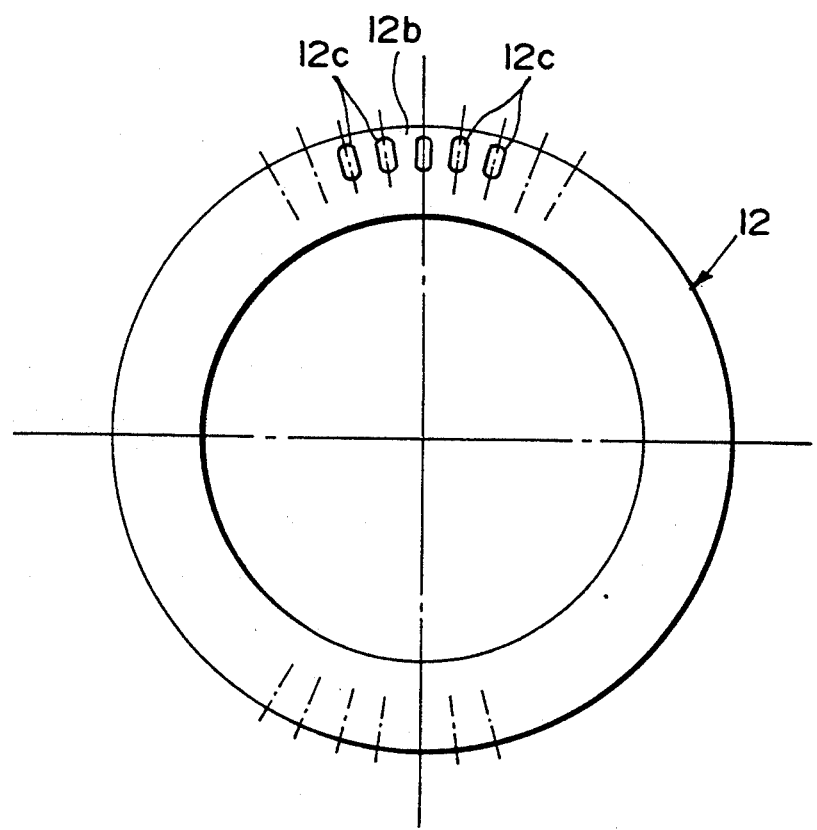
FIG. 4 is a detailed view of a clutch ring.

The reference numeral 12 designates a clutch ring for AF rotatively driven by a rotative drive source for AF such as an electric motor (as designated). The clutch ring 12 is disposed in opposed relationship with the outside of one flange portion 10d of the cam ring 10, and as shown in FIG. 4, a number of engagement holes 12c are radially formed at a predetermined pitch angle in the marginal edge portion 12b of the clutch ring 12. In FIG. 1, the reference character 12a denotes a segment gear portion which is formed on the outer periphery of the outer bass portion of the clutch ring 12 and with which meshes a pinion gear 13 receiving the transmission of rotation from the rotational drive source for AF, during the AF mode. The clutch ring 12 for AF is restricted in its movement in the direction of the optical axis by the stepped portion of the fixed cylinder 2 and a set ring and is rotatably supported.

The reference numeral 14 designates a clutch ring for MF disposed in the inner peripheral portion of the MF ring 6 in opposed relationship with the outside of the other flange portion 10e of the cam ring 10 and rotatably held in a state in which the movement thereof in the direction of the optical axis is restricted. The clutch ring 14 is normally rotatably connected to the MF ring 6 by a waving washer 15 interposed between the clutch ring 14 and the MF ring 6 functioning as a friction clutch between the two. Although not shown, a number of engagement holes 14b are radially formed at a predetermined pitch angle in the marginal edge portion 14a of the clutch ring 14 for MF, as in the aforedescribed clutch ring 12 for AF. The MF ring 6 and waving washer 15 thus provide an operating means manually operable to effect manual focusing of the focusing optical system.

The reference numeral 20 denotes a bistable type solenoid interposed between the flange portions 10d and 10e of the clutch ring 10. The solenoid 20 is designed such that when it is moved, for example, leftwardly, it keeps that state until a signal for moving it rightwardly comes into the solenoid and when an electrical signal for moving it rightwardly is applied to it, the solenoid shaft 20a thereof is moved to the right and keeps that state until a signal for moving the solenoid leftwardly is provided. The signal is provided on the basis of the changeover operation of a suitable mode changeover operating device (shown only in FIG. 2A for simplicity).

Figure 2A:
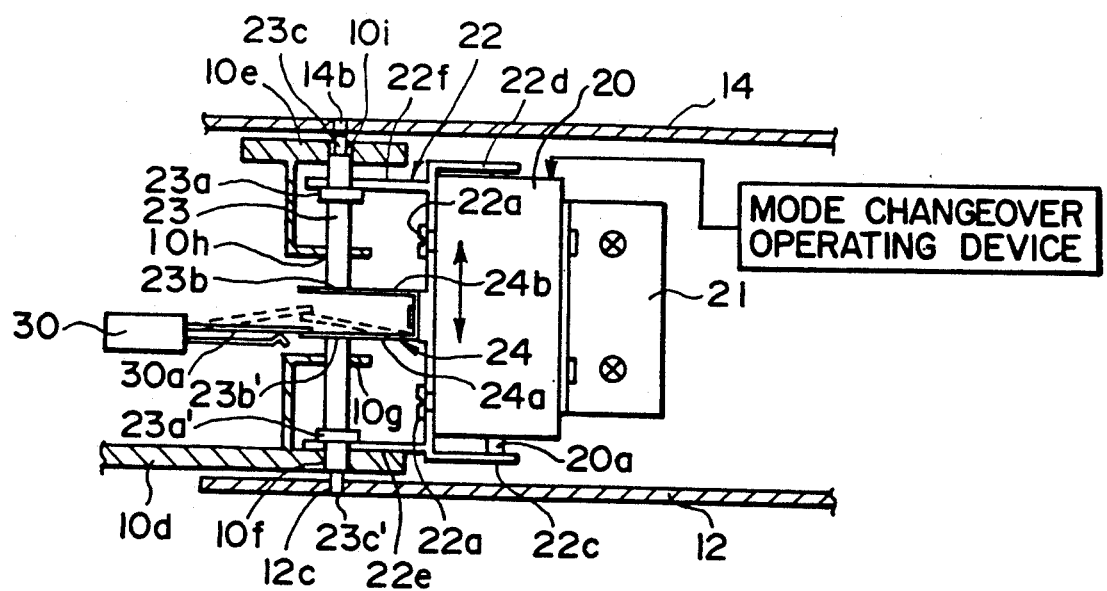
FIGS. 2A and 2B are a schematic plan view and a side view, respectively, showing on an enlarged scale an electromagnetic clutch portion characterizing the present invention.
Figure 2B:
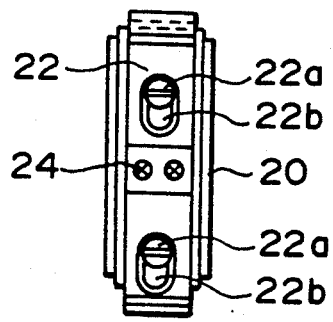
Figure 3:
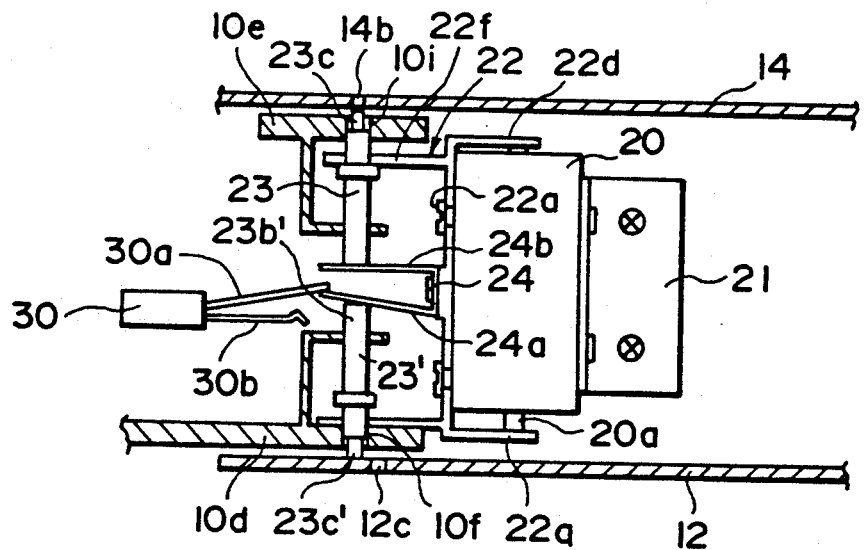
FIG. 3 is a view for illustrating the operative state of the electromagnetic clutch portion.

Referring to FIGS. 2A, 2B and 3, the bistable type solenoid 20 is integrally fixed to the outer peripheral portion of the cam ring 10 with a solenoid fixing plate 21 interposed therebetween. On the side of this bistable type solenoid 20, a generally U-shaped solenoid lever 22 is slidably provided, by the use of stepped small screws 22a and oval-shaped apertures 22b, for movement as indicated by the arrow in FIG. 2A. This solenoid lever 22 has bent pieces 22c and 22d on its opposite ends bearing against the solenoid shaft 20a of the bistable type solenoid 20 and thus, the solenoid lever 22 moves in the same direction as the solenoid shaft 20a. Also, arm portions 22e and 22f extending on the outer side of the solenoid lever 22 which is opposite to the bent pieces 22c and 22d have their tip ends formed into a fork-like shape and are engageable with the medium-diametered portions 23a and 23a' of clutch shafts 23 and 23' which will be described later.

The reference numerals 23' and 23 designate clutch shafts (clutch means) for AF and MF fitted and slidably supported in holes 10f, 10g and 10i, 10h, respectively, formed in the flange portions 10d and 10e of the cam ring 10. These clutch shafts 23 and 23' are designed to slide in the same direction with the movement of the solenoid lever 22. The reference numeral 24 denotes a substantially U-shaped clutch spring integrally fixed to the solenoid lever 22 by screws and having the tip ends of its extended portions 24a and 24b bearing against the shaft end portions 23b and 23b' of the clutch shafts 23 and 23'. The clutch shafts 23 and 23' are normally biased outwardly by the spring force of this clutch spring 24. The spring 24 together with the solenoid lever 22 and the solenoid 20 provide clutch driving means for driving the clutch shafts 23 and 23'.

The reference numeral 30 designates a detection switch as a mode changeover detecting device which, in a mode changeover clutch device comprising the solenoid 20, solenoid lever 22, clutch shafts 23', 23 and clutch spring 24 for effecting the AF mode/MF mode changeover in the lens barrel of the above-described construction, detects the movement of the extended portion 24a of the clutch spring 24 operating in operative association with the shaft end portion 23b' of the clutch shaft 23' for AF. The detection switch 30 has a switch contact piece 30a adapted to be closed and opened by the movement of said extended portion 24a. The detection switch 30 is capable of confirming, when it is in a state shown in FIG. 2A wherein said switch contact piece 30a is in contact with the other switch contact piece 30b, that mode changeover to AF has been reliably effected. It is, of course, also capable of detecting when, as shown in FIG. 3, the clutch shaft 23' is not engaged with the engagement hole 12c in the AF side clutch ring 12 through the cam ring 10 (that is, when the cam ring 10 and the AF side clutch ring 12 are in their non-engaged state in spite of the mode changeover operation being performed).

In the lens barrel 1 of the above-described construction, the AF mode/MF mode changeover operation is as follows.

FIGS. 1, 2A and 2B show the state of the changeover clutch device during the AF mode. When the device is brought to this state, the solenoid shaft 20a of the solenoid 20 is moved downwardly as viewed in FIG. 2 (rightwardly in FIG. 1) to the position shown, and the solenoid lever 22 is also moved downwardly to the position shown. The clutch spring 24 provided integrally with the solenoid lever 22 is also moved downwardly as viewed in FIG. 2, as is the AF side clutch shaft 23' by the spring force of the clutch spring 24. Thus, the forward small-diametered portion 23c' of the clutch shaft 23' is also moved downwardly as viewed in FIG. 2, and comes into engagement with one of the engagement holes 12c in the AF side clutch ring 12 through a hole 10f in the flange portion 10d of the cam ring 10, whereby the cam ring 10 and the AF side clutch ring 12 are connected together in the rotational direction by the clutch shaft 23' and are rotated as a unit. Of course, by the downward movement of the solenoid lever 22, the MF side clutch shaft 23 engaged with the extended portion 22f of the solenoid lever 22 is moved downwardly as viewed in FIG. 2, i.e., away from the MF side clutch ring 14 and is out of engagement with the engagement hole 14b therein.

When in this AF mode state, rotative power is given from a rotative drive source, (electric motor) to the pinion gear portion 12a of the driving mechanism and this pinion gear portion is rotated, whereby the AF side clutch ring 12 is rotated and the cam ring 10 connected thereto by the clutch shaft 23 is rotated by only a predetermined angle about the optical axis by the engagement of the fixed cylinder 2 side with the engagement pin 11 and the circumferential groove 10b. When the cam ring 10 is thus rotated, the focus cylinder 3 is moved along the optical axis to thereby effect focusing because the focus pin 3a on the outer periphery of the focus cylinder 3 has its tip end fitted in the cam slot 10a in the cam ring 10 through the guide slot 2c formed in the fixed cylinder 2 and extending in the direction of the optical axis.

At this time, the MF side is out of engagement, and the MF side clutch ring 14 is not rotated and the MF ring 6 is not rotated.

When the above-described clutch device is to be changed over from the AF mode state to the MF mode, an electrical signal is sent to the clutch device to move the solenoid shaft 20a upwardly as viewed in FIG. 2A. When this is done, the solenoid lever 22 is also moved upwardly. As a result, the clutch spring 24 integral with the solenoid lever 22 is also moved upwardly and therefore, by the pressing force thereof, the MF side clutch shaft 23 is also moved upwardly and comes into one of the engagement holes 14b in the MF side clutch ring 14 through the hole 10i in the flange portion 10c of the cam ring 10. At this time, the clutch shaft 23 for effecting the connection with the AF side clutch ring 12 is likewise moved upwardly as viewed in FIG. 2A and the connected state thereof is released. In the MF mode state the amount of manual operation by rotatively operating the MF ring 6 is transmitted to the MF side clutch ring 14 through the waving washer 15 and the rotational movement of this ring 14 is transmitted to the cam ring 10 connected thereto by the clutch shaft 23. It will be readily understood, that as in the aforedescribed AF mode, the focus cylinder 3 is thus moved in the direction of the optical axis to thereby effect focusing. Of course, at this time, the AF side is disconnected. AF side clutch ring 12 engaged by the forward small-diametered portion 23c' of the clutch shaft 23' at this time are provided circumferentially at a predetermined pitch angle, it is sometimes the case that the forward small-diametered portion 23c' of said clutch shaft bears against the wall portion of the clutch ring 12 and the engagement thereof with the engagement hole 12c is not achieved. This state is shown in FIG. 3, and at this time, in spite of the mode changeover operating device having already been changed over to the AF mode, even if the clutch ring 12 is rotated by a rotative drive source such as a motor, the rotation thereof will not be transmitted to the focus cylinder 3 through the cam ring 10. Only when the clutch ring 12 is rotated by a predetermined angle and any engagement hole 12c therein comes to a position corresponding to the forward small-diametered portion 23c' of the clutch shaft 23', does the clutch shaft 23 being pressed by the spring force of the clutch spring 24 move further in the direction of engagement such that the clutch device assumes the AF mode state.

The mode changeover operation when the forward small-diametered portion 23c' of such a clutch shaft 23' and the engagement hole 12c in the clutch ring 12 correspondingly thereto positionally deviate from each other can be completed reliably during the operation time of the half-depression timer by the release button when the power source voltage on the camera side is sufficient. However, if the half-depression timer by the release button assumes the 0sec hold state, whereby the half-depression switch is changed over from its ON state to its OFF state and the supply of electric power to the various portions of the camera is cut off in the course of the operation, the changeover to the AF mode by the solenoid 20 will not be completed.

Of course, such a problem during the mode changeover operation likewise arises when changeover is effected from the AF mode to the MF mode.

According to the present invention, in order to solve such a problem resulting from the deviation from the connected position of the clutch device during the mode changeover, the detection switch 30 is additionally provided as a detecting device for detecting whether mode changeover has been effected by the mode changeover operation. In the form shown, the switch contact piece 30a is made to bear against the extended portion 24a of the clutch spring 24 operatively associated with the movement of the AF side clutch shaft 23. In addition, 23b' of the AF side clutch shaft 23' bears against the extended portion 24a of the above-described clutch spring 24 and therefore, as shown in FIG. 3, the extended portion 24a becomes flexed in the non-connected state of the clutch device, such that the switch contact piece 30a becomes disengaged from the other switch contact piece 30b. by the provision of such a switch 30, when the focus adjusting device is in the AF mode state, it can be judged that the clutch is in its non-connected state when the above-described switch 30 is in its OFF state. Accordingly, even when return to the AF mode (or the MSF mode) becomes impossible, such state can be detected, and the operative state of the focus adjusting mechanism can be reliably determined by the photographer. Thus, the reliability of the photographing operation can be secured.

Further, according to the present invention, design is made such that when the unsatisfactory changeover is confirmed by the detection switch 30, a rotative drive source such as a motor is automatically operated by a signal from a CPU or the like (control means) during the next supply of electric power, whereby the connection by the change-over of the above-described clutch is reliably completed.

According to the present invention if when the clutch device has its changeover operation stopped by the supply of electric power from the camera side being cut off, it is detected that in spite of one mode being selected, the clutch device is not displaced to that position, and the clutch device is automatically displaced for changeover in response to the next supply of electric power to thereby ensure one changeover position to be always secured, whereby reliable focusing of the camera can be accomplished.

In the particularly, construction described above, when during the changeover operation from the MF mode to the AF mode, the changeover operation to the AF mode is incomplete and the clutch is not changed over to the AF mode side, that state is detected. Then, with the next half-depression of the release button bringing the half-depression switch into its ON state, the the AF side can be again operated to complete the mode change-over, whereby reliable operation of the camera can be secured.

The present invention is not restricted to the structure of the above-described embodiment and may be modified in various ways, such as the shape, structure, etc. of each portion of the lens barrel 1 including the focusing optical system, as will be apparent to those skilled in the art.

As described above, according to the lens barrel of the present invention, provision is made of a detecting device for detecting whether the electromagnetic clutch for selectively effecting the AF mode/MF mode changeover of the focus adjusting mechanism has been completely changed over. Thus, with a simple and inexpensive construction, when the change-over operation is performed from the MF mode to the AF mode or from the AF mode to the MF mode, the changed-over state of said clutch can be confirmed. Moreover, the design may be such that even when the half-depression switch is changed over from its ON state to its OFF state and the supply of electric power to the various portions of the camera is cut of, so that the electromagnetic clutch becomes unable to return completely to the AF mode or the MF mode, a changeover state is secured when the half-depression switch is next brought into its ON state.

We claim:

1. A lens barrel including:
   a focusing optical system movable on the optical axis thereof for focusing;
   moving means for moving said focusing optical system in the direction of the optical axis;
   electric motor means for driving said moving means to thereby effect auto focusing;
   operating means manually operable for driving said moving means to thereby effect manual focusing;
   clutch means displaceable to a first position for connecting said moving means and said electric motor means together and to a second position for releasing the connection between said moving means and said electric motor means and connecting said moving means and said operating means together;
   clutch driving means for displacing said clutch means to said first position and said second position;
   mode changeover operating means for selecting between one of a first mode in which auto focusing is effected and a second mode in which manual focusing is effected and for operating said clutch driving means to displace said clutch to said first position when said said first mode is selected, and to said second position when said second mode is selected;
   detecting means for detecting completed displacement of said clutch means to said first position and outputting an electrical signal indicative thereof; and
   control means responsive to said electrical signal output by said detecting means, when said clutch means has not been completely displaced to said one position due to a cut-off of electric power, for operating said electric motor means in order to effect completion of the displacement of said clutch means to said first position upon the next supply of electric power.

2. A lens barrel including:
   a focusing optical system movable on the optical axis thereof for focusing;
   moving means for moving said focusing optical system in the direction of the optical axis;
   electric motor means for driving said moving means to thereby effect auto focusing;
   operating means manually operable for driving said moving means to thereby effect manual focusing;
   clutch means displaceable to a connecting position for connecting said moving means and said electric motor means together and to a releasing position for releasing the connection between said moving means and said electric motor means;
   clutch driving means for displacing said clutch means to said connecting position and said releasing position;
   mode changeover operating means for selecting between one of a first mode in which auto focusing is effected and a second mode in which manual focusing is effected and for operating said clutch driving means to displace said clutch means to said connecting position when said first mode is selected, and to said releasing position when said second mode is selected;
   detecting means for detecting completed displacement of said clutch mean to said connecting position and outputting an electrical signal indicative thereof; and
   control means responsive to said electrical signal output by said detecting means, when said clutch means has not been completely displaced to said connecting position due to a cut-off of electric power, for causing operation of said electric motor means in order to effect completion of the displacement of said clutch means to said connecting position upon the next supply of electric power.

* * * * *